United States Patent
Mack

(10) Patent No.: US 12,258,280 B2
(45) Date of Patent: Mar. 25, 2025

(54) METHOD FOR CONCENTRATING AND PURIFYING ELUATE BRINE FOR THE PRODUCTION OF A PURIFIED LITHIUM COMPOUND

(71) Applicants: Veolia Water Solutions & Technologies Support, Saint-Maurice (FR); Bernard Roy Mack, Natick, MA (US)

(72) Inventor: Bernard Roy Mack, Natick, MA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 734 days.

(21) Appl. No.: 17/438,495

(22) PCT Filed: Mar. 9, 2020

(86) PCT No.: PCT/US2020/021640
§ 371 (c)(1),
(2) Date: Sep. 13, 2021

(87) PCT Pub. No.: WO2020/185645
PCT Pub. Date: Sep. 17, 2020

(65) Prior Publication Data
US 2022/0144655 A1 May 12, 2022

Related U.S. Application Data

(60) Provisional application No. 62/817,624, filed on Mar. 13, 2019.

(51) Int. Cl.
| | |
|---|---|
| *C01D 15/08* | (2006.01) |
| *B01D 9/00* | (2006.01) |
| *B01D 15/36* | (2006.01) |
| *B01D 61/02* | (2006.01) |
| *B01D 61/42* | (2006.01) |
| *B01D 61/44* | (2006.01) |
| *B01D 61/58* | (2006.01) |
| *B01J 47/12* | (2017.01) |
| *C02F 9/00* | (2023.01) |
| *C02F 1/04* | (2023.01) |
| *C02F 1/42* | (2023.01) |
| *C02F 1/44* | (2023.01) |
| *C02F 1/469* | (2023.01) |
| *C02F 1/52* | (2023.01) |

(52) U.S. Cl.
CPC .......... *C01D 15/08* (2013.01); *B01D 9/0031* (2013.01); *B01D 15/362* (2013.01); *B01D 61/025* (2013.01); *B01D 61/027* (2013.01); *B01D 61/029* (2022.08); *B01D 61/422* (2013.01); *B01D 61/44* (2013.01); *B01D 61/58* (2013.01); *B01J 47/12* (2013.01); *C02F 9/00* (2013.01); *B01D 2009/0086* (2013.01); *B01D 2311/06* (2013.01); *B01D 2311/08* (2013.01); *B01D 2311/2512* (2022.08); *B01D 2311/2523* (2022.08); *B01D 2311/2623* (2013.01); *B01D 2311/2642* (2013.01); *B01D 2311/2673* (2013.01); *C02F 1/04* (2013.01); *C02F 1/42* (2013.01); *C02F 2001/425* (2013.01); *C02F 1/441* (2013.01); *C02F 1/442* (2013.01); *C02F 1/4693* (2013.01); *C02F 1/52* (2013.01); *C02F 2001/5218* (2013.01)

(58) Field of Classification Search
CPC .... C01D 15/08; C01D 15/362; B01D 61/029; B01D 61/0031; B01D 61/025; B01D 61/027; B01D 61/422; B01D 61/44; B01D 61/58; B01D 9/0031; B01J 47/12; C02F 9/00
See application file for complete search history.

(56) References Cited

U.S. PATENT DOCUMENTS 8,741,256 B1  6/2014  Harrison

FOREIGN PATENT DOCUMENTS

| CN | 107298450 A | * 10/2017 | ............. C01D 15/02 |
| CN | 107399747 A | * 11/2017 | ............. C01D 15/04 |
| WO | 2011133165 A1 | 10/2011 | |
| WO | 2017039724 A1 | 3/2017 | |
| WO | WO-2018208305 A1 | * 11/2018 | ........... B01D 61/027 |

* cited by examiner

*Primary Examiner* — Yong L Chu
(74) *Attorney, Agent, or Firm* — COATS & BENNETT, PLLC

(57) ABSTRACT

A method is disclosed for concentrating and purifying an eluate brine and producing a purified lithium compound. An extraction eluate, rich in lithium, is directed to a nanofiltration unit or a softening process that removes sulfate and/or calcium and magnesium. Permeate from the nanofiltration unit or the effluent from the softening process is directed through an electrodialysis unit. As the lithium-rich solution moves through the electrodialysis unit, lithium, sodium and chloride ions pass from the solution through a cation-transfer membrane and an anion-transfer membrane to concentrate compartments. A dilute stream is directed through the concentrate compartments and collects the lithium, sodium and chloride ions. The electrodialysis unit also produces a product stream which contains non-ionized impurities, such as silica and/or boron. Concentrate from the electrodialysis unit is subject to a precipitation process that produces a lithium compound that is subsequently subjected to a purification process.

5 Claims, 3 Drawing Sheets

METHOD FOR CONCENTRATING AND PURIFYING ELUATE BRINE FOR THE PRODUCTION OF A PURIFIED LITHIUM COMPOUND

FIELD OF THE INVENTION

The present invention relates to the recovery and purification of lithium and to a process that employs electrodialysis to separate lithium ions from a feed solution containing lithium and various impurities.

BACKGROUND OF THE INVENTION

The demand for lithium is outpacing the rate lithium is being mined from brines due to the continuing advancements in mobile devices and electric cars. Lithium is an abundant element. There are, however, few commercial resources where lithium is found in concentrations sufficient for producing useful lithium compounds. The primary sources of lithium are in brines from salars and salt lakes and ores. Geothermal brines are another source for lithium. A large percentage of lithium chloride and lithium carbonate and their derivatives are commercially produced from the recovery of lithium from brines, typically via natural evaporative processes.

In one example, lithium is extracted from a brine drawn from a solar pond by an elution process that produces a solution rich in lithium, sodium chloride and various impurities. Typical impurities include calcium, magnesium, sulfate, along with silica and boron, such as silica, magnesium and calcium. One current approach to purifying brines rich in lithium is through reverse osmosis and evaporation. This approach typically results in the production of a concentrate containing large amounts of scaling species, such as silica. The presence of such large amounts of silica tends to scale the concentrating system. In order to overcome this scaling, additional pre-treatment steps are required to remove scaling compounds prior to final concentration in an evaporator or crystallizer system.

Therefore, there has been and continues to be a need for processes and systems that produce high purity lithium compounds from brines that include impurities, such as calcium, magnesium, sulfate, silica and boron.

SUMMARY OF THE INVENTION

The present invention, in one embodiment, relates to a method of purifying an extraction eluate rich in lithium, sodium chloride, but containing impurities, such as calcium, magnesium, sulfate and silica. The extraction eluate is directed to a nanofiltration unit or a softening process that removes sulfate and associated calcium and magnesium. Permeate from the nanofiltration unit or the effluent from the softening process is directed to and through an electrodialysis unit. Prior to reaching the electrodialysis unit, steps are taken, if required, to maintain a substantial portion of the silica or another impurity as non-ionized. As the lithium rich solution moves through the electrodialysis unit, the lithium, sodium and chloride ions pass from the solution through a cation-transfer membrane and an anion-transfer membrane to concentrate compartments in the electrodialysis unit. An aqueous solution is circulated through the concentrate compartments and collects the lithium, sodium and chloride ions to produce a brine rich in lithium, sodium and chloride ions. The electrodialysis unit also produces a product stream which is deficient in lithium, sodium and chloride but which contains the non-ionized impurities, such as silica. Concentrate from the electrodialysis unit is subjected to a precipitation process that produces lithium carbonate that is subsequently subjected to a purification process.

In another embodiment, a lithium carbonate purification process is carried out without nanofiltration or softening. Here the extraction eluate is directed into an electrodialysis unit comprising monovalent selective cation and anion exchange membranes. The monovalent cation and anion membranes preferentially transfer monovalent cations and anions (in this embodiment lithium, sodium and chloride ions) to concentrate compartments where they are collected by an aqueous solution or demineralized water to form a concentrate rich in lithium, sodium and chloride but which may contain some hardness in the form of calcium and magnesium, for example. The concentrate is then directed to an ion exchange unit, such as a chelating ion exchange unit, to remove hardness. Thereafter, lithium (in the form of either carbonate, for example) can be removed from the concentrate.

Other objects and advantages of the present invention will become apparent and obvious from a study of the following description and the accompanying drawings which are merely illustrative of such invention.

DESCRIPTION OF EXEMPLARY EMBODIMENTS

The present invention relates to a process for recovering lithium. Lithium is a highly reactive alkali metal that offers excellent heat and electrical conductivity. These properties make lithium particularly useful for lithium ion batteries for electric cars and consumer electronics, as well as useful for pharmaceutical and chemical applications. Because of its high reactivity, pure elemental lithium is not found in nature but is instead present as a constituent of salts and other compounds. Most commercial lithium is available in the form of lithium carbonate which is a relatively stable compound that can easily be converted to other salts or chemicals.

Lithium salts are found in underground deposits of brine, mineral ore as well as sea water and geothermal brines. While lithium is fairly abundant, not all lithium sources are deemed economically viable at this time. Generally speaking, however, commercial lithium arises from two main sources: underground brine and mineral ore deposits. A large amount of today's lithium is recovered from liquid brine reservoirs located beneath salt flats, known as salars. Other lithium-rich brine resources include geothermal and oil field brines.

Lithium recovery in general is a relatively long process. In the case of salar brine deposits, for example, drilling is generally required to access the brine deposits. Once accessed, the brine containing lithium is pumped to the surface and placed in solar ponds where an evaporation process takes place. Brine remains in the solar ponds until most of the water content has been removed through solar evaporation. Salar brines, for example, are concentrated and in addition to lithium, typically contain sodium, chloride, as well as any number of impurities such as sulfate, silica and/or boron.

Figure 1:
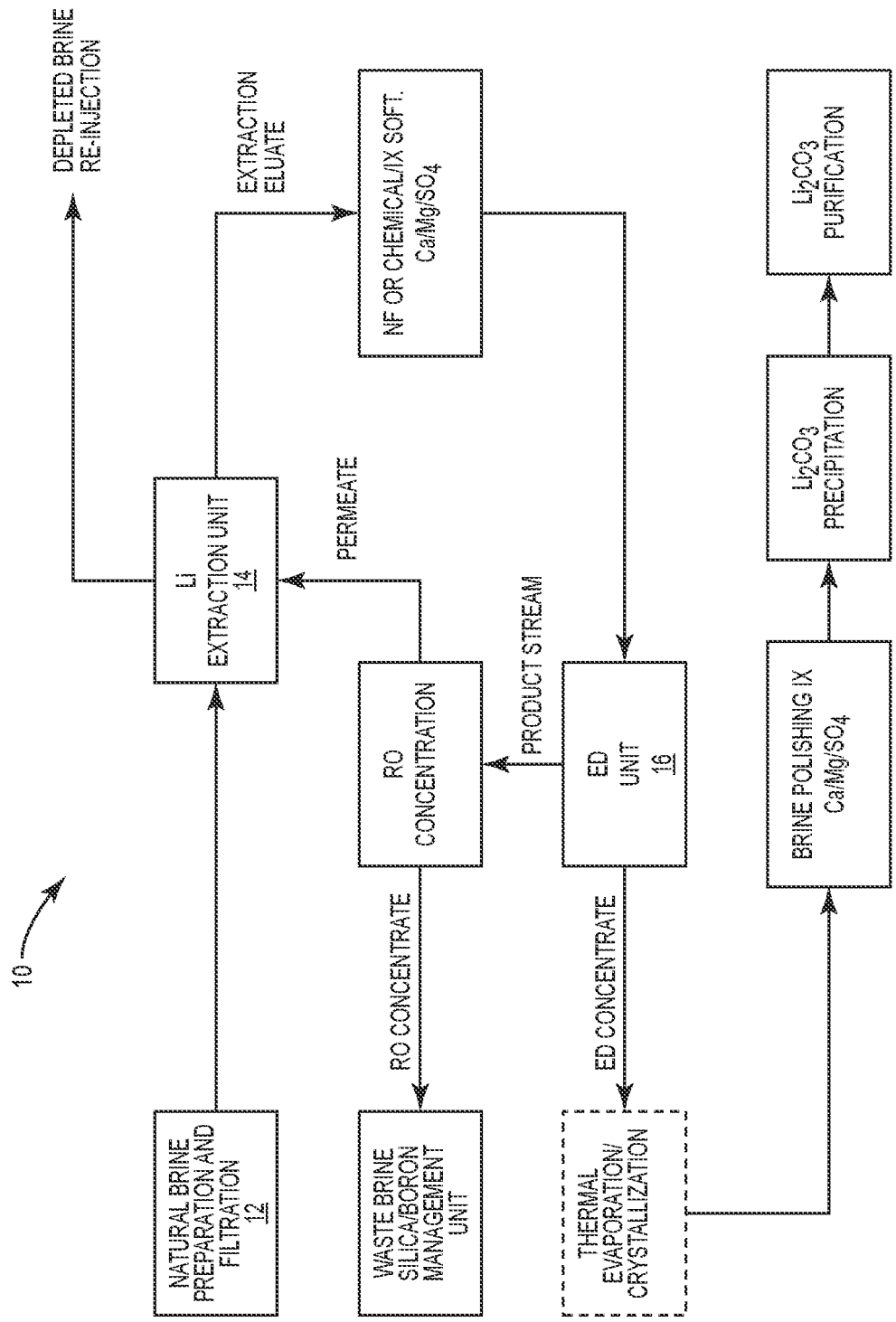
FIG. 1 is a schematic illustration of a lithium recovery process.

FIG. 1 is a diagrammatic view showing one embodiment of a lithium recovery process. The process is referred to generally by the numeral 10. Once the brine in an evaporation pond has reached a selected lithium concentration, the brine is pumped from the solar pond and subjected to a process that is referred to in FIG. 1 as natural brine preparation and filtration 12. This process can vary depending on the makeup of the brine and the particular processes that follow. In many cases, some type of filtration is employed to remove suspended solids from the brine. In addition, this process may employ other means to precipitate or otherwise remove certain impurities from the brine at this stage.

Typically, after brine preparation and filtration, the brine is rich in lithium and, in the present example, includes sodium chloride and other impurities. As noted above, the impurities in the brine can vary based on the source of the brine. In this exemplary process, the impurities include sulfate, silica and/or boron, along with hardness in the form of calcium and magnesium. There may also be small trace amounts of transitional metals. In any event, after the preparation and filtration step referred to above, the brine is subjected to a lithium extraction process 14. Here lithium is extracted from the effluent from the natural brine preparation and filtration stage discussed above. Various lithium extraction processes can be employed and people skilled in the art appreciate various lithium extraction processes. In the exemplary process shown in FIG. 1, an adsorption process can be employed for extracting lithium from the brine. Various adsorbents or resins can be used. For example, lithium selective ion exchange adsorbents can be used for extracting lithium from brines. Inorganic ion exchange adsorbents, such as lithium manganese dioxide, spinel lithium titanium oxides and lithium aluminum layered double hydroxide chloride are known to have high lithium selective uptake capacity. These adsorption processes produce an extraction eluate and a depleted brine that is typically reinjected into underground brine deposits.

Constituents of the exemplary eluate will vary depending on the lithium source and the particular lithium extraction process employed. In this example, the lithium extraction process 14 produces a brine rich in lithium and sodium chloride and having a range of impurities, such as silica, sulfate, boron, calcium and magnesium. In one example, the total suspended solids in the brine can be approximately 11,000 mg/L and contain approximately 20 mg/L of silica, 100 mg/L of boron, 50 mg/L of sulfate and approximately 50 mg/L of calcium, as well as approximately 50 mg/L of magnesium. It is stressed that these are exemplary concentrations and that the particular concentrations of these constituents will vary from one lithium production process to another.

After the lithium extraction process 14, the process focuses on removing some impurities from the lithium-rich brine. In the exemplary process discussed here, the sulfate, calcium and magnesium is first addressed. Various approaches, such as nanofiltration, chemical softening or ion exchange softening, can be employed, In this exemplary process, the lithium-rich brine is subjected to a nanofiltration process which produces a reject stream containing sulfate and calcium and magnesium associated with the sulfate. Tests indicate that 95%-99% of the sulfate can typically be removed from the lithium-rich brine. Thus, the permeate from the nanofiltration process will continue to be a brine rich in lithium and sodium chloride and may include some residual hardness (calcium and magnesium), along with other impurities which, in this example, are principally silica and boron. It is contemplated that, in some cases, the permeate from the nanofiltration process will contain 90% wt. of lithium and sodium chloride.

Figure 2:
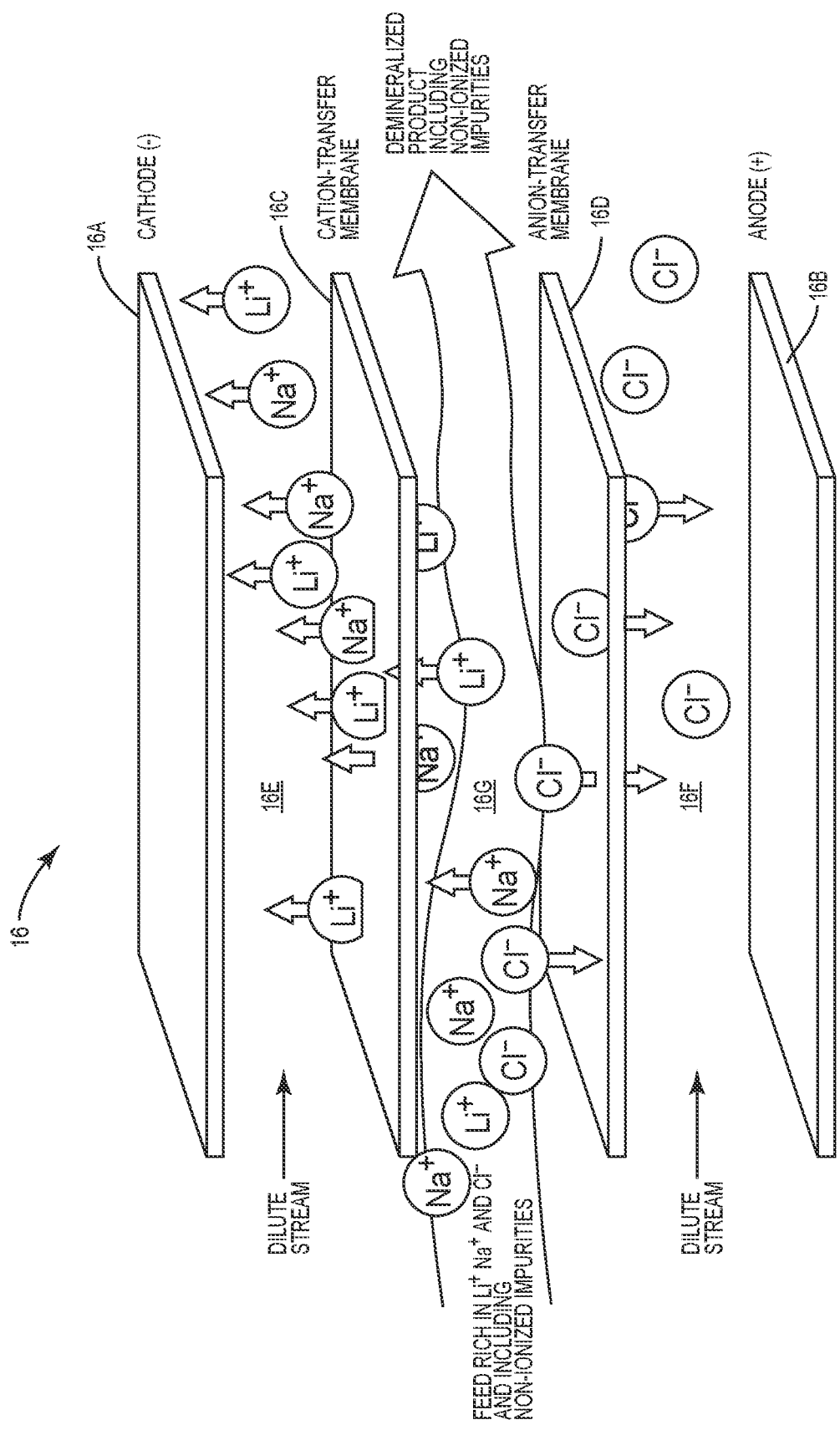
FIG. 2 is a schematic illustration of an electrodialysis unit and illustrates the separation of lithium, sodium and chloride ions from a feed.

The permeate from the nanofiltration unit, rich in lithium and sodium chloride, is directed to an electrodialysis unit 16. The principal function of the electrodialysis unit 16 is to separate the lithium, sodium and chloride ions from the brine and produce a concentrate rich in lithium, sodium and chloride ions. FIG. 2 is an exemplary schematic illustration of a suitable electrodialysis unit 16 that is configured to separate and concentrate the lithium, sodium and chloride ions. Electrodialysis unit 16 includes a cathode 16A and an anode 16B. Between the cathode 16A and the anode 16B is a cation transfer membrane 16C and an anion-transfer membrane 16D. This forms two concentrate compartments 16E and 16F and a center product compartment 16G.

The feed to the electrodialysis unit 16 is rich in lithium, sodium and chloride ions, but there are still impurities in the feed. To address some impurities, the process takes steps to maintain these impurities in a non-ionized state. If the impurity is non-ionized, it will not pass through the cation-transfer membrane 16A or the anion-transfer membrane 16D but will remain in the product compartment 16G and ultimately will be a constituent of the demineralized product that leaves the product compartment. See FIG. 2. In this example, the impurities include silica and/or boron. Thus, the process aims to maintain the silica and/or boron in the feed non-ionized. Silicon (Si) is primarily present as $SiO_2$ in water at an acid or neutral pH. When the pH is increased to above 9, the silica becomes ionized by the formation of $HSiO3^-$ which is how the silica solubility and rejection is increased in high pH reverse osmosis processes. In any event, at a pH below 7, substantially all of the silica in the feed is non-ionized and passes through the electrodialysis unit 16 and form a part of the demineralized product. The same holds true for boron. Thus, in the system and processes disclosed herein, the pH of the feed to the electrodialysis unit 16 is monitored and maintained at or below 7.

Referring to FIG. 2 and the electrodialysis unit 16, as the feed moves through the center compartment 16G, the lithium and sodium ions having a positive charge pass through the cation-transfer membrane 16C into compartment 16E. Chloride, being a negative ion, passes through the anion-transfer membrane 16D to compartment 16F. A selected medium, sometimes referred to as a dilute stream, such as demineralized water, is circulated through the concentrate compartments 16E and 16F to collect the lithium, sodium and chloride ions. The dilute stream with the collected lithium, sodium and chloride ions are merged and thereafter split and recycled through the concentrate compartments 16E and 16F, all the while continuing to collect lithium, sodium and chloride ions.

As shown in FIG. 1, the product stream from the electrodialysis unit 16 is directed to an RO system that concentrates the product stream. That is, the RO system concentrates the impurities in the product stream, which in this example are silica and/or boron. The RO system produces permeate that is directed to the lithium extraction unit 14. Concentrate from the RO system is referred to as a waste brine and is directed to a waste brine silica/boron management unit. See FIG. 1. Here the concentrate from the RO system, including the impurities that were present in the product stream, can be further treated.

In some cases, it is possible that the impurities in the concentrate produced by the electrodialysis unit 16 require removal through thermal evaporation or crystallization. This is, however, optional in many cases. Even if required, the amount of impurities in the concentrate may still be sufficiently low that only a relatively small thermal evaporation and crystallization is required.

It is possible that the electrodialysis concentrate might still contain residual hardness above a trace amount, as well as transition metals. Residual hardness can be removed by ion exchange softening. FIG. 1 refers to this as brine polishing IX. Various ion exchange types can be employed. For example, chelating ion exchange resin can be employed to remove residual hardness, as well as transition metals not removed by the nanofiltration process. Once the electrodialysis concentrate has been subjected to ion exchange treatment for removing residual hardness, the effluent produced by this process comprises a purified solution of lithium chloride and sodium chloride.

After brine polishing with an ion exchange unit, the effluent is subjected to a precipitation process that precipitates lithium carbonate. Various types of reagents can be employed at this stage to precipitate substantially pure lithium compounds. In one example, sodium carbonate is mixed with the lithium, sodium and chloride-rich stream to cause the precipitation of lithium carbonate. Once the lithium carbonate has been precipitated, various processes can be employed for the purification of lithium carbonate. See FIG. 1.

Figure 3:
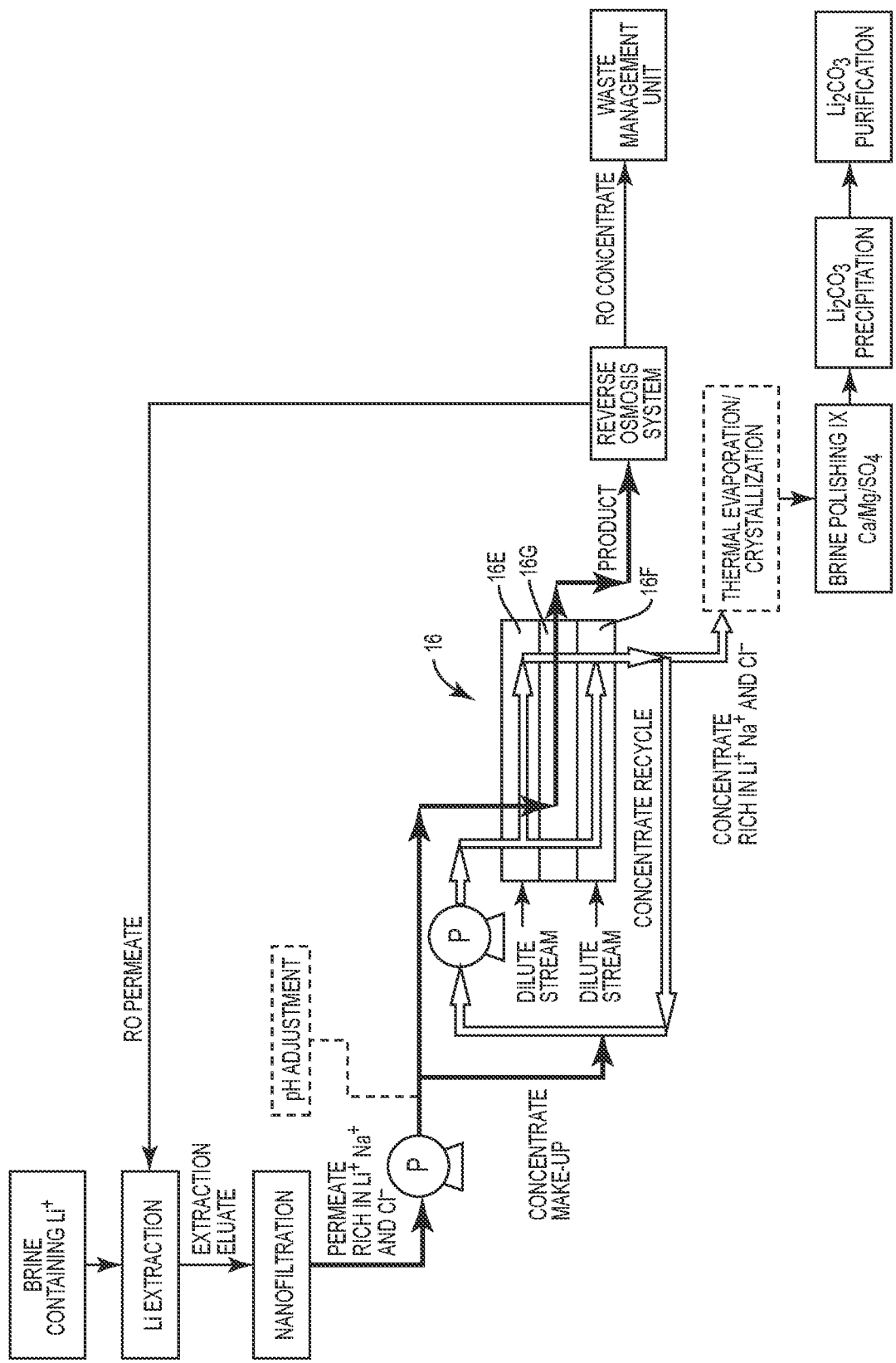
FIG. 3 is a schematic illustration of the lithium recovery process showing how an electrodialysis process is integrated into other steps of the lithium recovery process.

FIG. 3 is a schematic illustration that depicts how the electrodialysis unit 16 is integrated into the overall lithium recovery process. The source of the lithium-containing brine, the lithium extraction process, and the nanofiltration process has been described above. Moreover, the basic electrodialysis process has been described.

As seen in FIG. 3, the permeate from the nanofiltration unit is rich in lithium, sodium and chloride ions. The permeate is directed into the center compartment 16G of the electrodialysis unit 16. As discussed above, the lithium and sodium ions pass to the concentrate compartment 16E while the chloride ions pass to the concentrate compartment 16F. The concentrates produced by the electrodialysis unit 16 is recycled through the electrodialysis unit and in the process continues to collect lithium, sodium and chloride ions. A portion of the concentrate being recycled through the electrodialysis unit 16 is separated and directed through a number of processes discussed above. These include the optional thermal evaporation/crystallization process, brine polishing ion exchange treatment, lithium carbonate precipitation and lithium carbonate purification.

The product stream containing the impurities, such as silica and/or boron, is directed to a reverse osmosis system where the impurities are concentrated into an RO concentrate and then directed to a waste management unit. See FIG. 3. The permeate from the reverse osmosis system is recycled back to the lithium extraction process.

As an alternative to the process discussed above and shown in FIGS. 1-3, an alternative process might include an electrodialysis unit which employs monovalent selective cation and anion exchange membranes followed by chelating ion exchange. Electrodialysis using monovalent selective membranes utilizes membranes that preferentially transport monovalent anions or monovalent cations. Using a monovalent selective electrodialysis process would enable eliminating the nanofiltration process discussed above while also separating silica and/or boron scaling components from the concentrate solution. In the case of monovalent selective membranes, it is preferred to feed the concentrating compartment with demineralized water to collect the sodium, lithium and chloride ions. Concentrate from the electrodialysis process may further include treatment through a chelating ion exchange process in order to remove hardness ions since the monovalent selective membranes do not have a 100% rejection rate for divalent ions.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of recovering lithium carbonate from a brine rich in lithium, sodium and chloride and having impurities in the form of hardness, sulfate, and silica, the method comprising:
   directing the brine to a nanofiltration unit and subjecting the brine to nanofiltration and removing sulfate from the brine, along with hardness associated with the sulfate;
   wherein after nanofiltration, the brine still contains silica and residual hardness and remains rich in lithium, sodium and chloride;
   after nanofiltration, maintaining conditions in the brine that result in the silica being substantially non-ionized;
   further after nanofiltration, directing the brine through an electrodialysis unit and subjecting the brine to an electrodialysis process and producing a concentrate rich in lithium, sodium and chloride and a product stream depleted in lithium, sodium and chloride but including the substantially non-ionized silica;
   after subjecting the brine to the electrodialysis process, directing the concentrate to an ion-exchange unit and removing residual hardness from the concentrate;
   after removing residual hardness from the concentrate, directing the concentrate of lithium, sodium and chloride to a precipitating unit and mixing a selected reagent with the concentrate and precipitating lithium carbonate; and
   recovering the precipitated lithium carbonate.

2. The method of claim 1 further including:
   directing the product stream from the electrodialysis unit to a reverse osmosis unit and producing a permeate stream and a concentrate stream containing silica; and
   utilizing the permeate stream in a lithium extraction process that take places upstream of the nanofiltration unit.

3. The method of claim 1 further including:
   directing the concentrate from the electrodialysis unit to an evaporator or crystallizer and further concentrating the concentrate; and
   thereafter directing the further concentrated concentrate to the ion exchange unit.

4. The method of claim 1 including mixing sodium carbonate with the concentrate rich in lithium, sodium and chloride and precipitating lithium carbonate.

5. The method of claim 1 wherein the electrodialysis unit comprises a feed compartment that produces the product stream and two concentrate compartments that produce the concentrate and which are disposed on opposite sides of the feed compartment; and wherein the concentrate compartments are separated from the feed compartment by a cation-transfer membrane and an anion-transfer membrane.

* * * * *